United States Patent [19]

Gordon

[11] Patent Number: 5,342,122
[45] Date of Patent: Aug. 30, 1994

[54] DISPLAY AND STORAGE HOLDER FOR TAPE CASSETTES

[75] Inventor: Edward A. Gordon, Dothan, Ala.

[73] Assignee: Sony Electronics Inc., Park Ridge, N.J.

[21] Appl. No.: 915,526

[22] Filed: Jul. 20, 1992

[51] Int. Cl.$^5$ ............... A47B 81/00; F16B 12/00
[52] U.S. Cl. ................... 312/9.48; 312/111; 312/329
[58] Field of Search ............ 312/9.47, 9.48, 109, 312/111, 9.52, 9.53, 9.55, 329; 206/387

[56] References Cited

U.S. PATENT DOCUMENTS

| | | | |
|---|---|---|---|
| 2,620,251 | 12/1952 | Restivo | 312/329 X |
| 2,752,215 | 6/1956 | Piess | 312/111 |
| 2,790,691 | 4/1957 | Goebel | 312/111 |
| 3,262,745 | 7/1966 | Gölzer | 312/329 X |
| 3,393,933 | 7/1968 | Cornelius | 312/111 X |
| 3,552,817 | 1/1971 | Marcolongo | 312/111 X |
| 3,751,127 | 8/1973 | Black, Sr. et al. | 312/111 |
| 3,909,088 | 9/1975 | Dennehey et al. | |
| 4,026,615 | 5/1977 | Tazaki et al. | |
| 4,307,809 | 12/1981 | Haswell | |
| 4,339,162 | 7/1982 | Gelardi et al. | |
| 4,412,708 | 11/1983 | Palka | 312/329 |
| 4,453,785 | 6/1984 | Smith | 312/9.48 |
| 4,549,775 | 10/1985 | Carter | |
| 4,589,549 | 5/1986 | Hehn | |
| 4,911,298 | 3/1990 | Miyagawa et al. | |
| 4,962,854 | 10/1990 | Ricci | |
| 5,039,178 | 8/1991 | Muenzer et al. | |

*Primary Examiner*—Joseph M. Gorski
*Attorney, Agent, or Firm*—William S. Frommer; Alvin Sinderbrand

[57] ABSTRACT

A display and storage holder for tape cassettes is made up of at least one box-like housing having opposite side, top and bottom walls and a back panel, and being open at the front for receiving therethrough a plurality of the tape cassettes, connectors removably extending across at least the side walls of each housing and each having front and back end portions engageable with the housing for securing the respective connector thereto, a door panel separate from each box-like housing and having side edges and top and bottom edges dimensioned to extend across the front of the housing, dimples in the front end portions of the connectors extending across the side walls, ball-shaped projections on the door panel adjacent one of the side edges and which are relatively tightly engageable in the dimples on the connectors extending across the adjacent one of the side walls for defining a hinge for the door panel, and ball-shaped projections on the door panel adjacent the other of the side edges and which are relatively loosely engageable with the dimples in the connectors extending across the other of the side walls for defining a detent latch to hold the door panel in a closed position.

13 Claims, 3 Drawing Sheets

DISPLAY AND STORAGE HOLDER FOR TAPE CASSETTES

BACKGROUND OF THE INVENTION

1. Field of the Invention

This invention relates generally to the packaging, display and storage of tape cassettes, particularly video tape cassettes.

2. Description of the Prior Art

At present, video tape cassettes are usually individually packaged and the packaging material employed includes an outer wrapping enclosing a sleeve or the like in which the cassette housing is slidable inserted. When the cassette is removed from such individual packaging, there is left a relatively large amount of packaging material which is costly and has to be discarded with an undesirable impact on the environment. Furthermore, after the individually packaged cassettes have been unwrapped, the consumer usually further purchases some sort of storage device for containing the unwrapped cassettes, and such storage device is also wrapped or packaged, as purchased, so that still more throw-away packaging material needs to be discarded. Moreover, when a cassette storage device or system is purchased, the number of cassettes to be stored seldom equals the cassette capacity of the purchase storage device.

A cassette storage device has been disclosed, for example, in U.S. Pat. No. 4,549,775, which includes a housing having multiple compartments each adapted to contain an audio tape cassette, for example, of the so-called Philips type, with a leaf spring being provided in each compartment for urging a cassette therein into either a cassette stored position or a cassette removal position. Further, the outer surfaces of the housing are formed with tenons and mortises for interlocking with corresponding mortises and tenons, respectively, on other housings, for forming an assembly of storage devices. However, the housings have complicated configurations and thus or not easily or inexpensively molded. Further, even when the cassettes are in their stored positions, the respective storage compartments are open at the front so that the stored cassettes are not adequately protected.

In a known video cassette storage box, for example, as disclosed in U.S. Pat. No. 4,339,162, each storage box defines an individual compartment slightly larger than the normal size video cassette and is provided with interlocking dove tail structures at the four corners of the box so that a plurality of storage boxes may be assembled together, either vertically or horizontally, to provide a storage structure. A slidable tray is mounted within each storage box and has a tab extending therefrom which extends out of the storage box so that it can be manually pulled for removing the tray, and with it a video cassette thereon, from the storage box. Once again, each storage box is substantially open at its front even when a video cassette is stored therein so that the stored cassette is not adequately protected. Furthermore, the provision of an individual storage box with a slidable tray therein for each video cassette results in a relatively complex and therefore expensive structure.

Additional known cassette containers are shown in U.S. Pat. No. 4,026,615 and No. 3,909,088, and are intended primarily for the storage of audio cassettes. Although such cassette storage containers are capable of being assembled together in side-by-side relation to form a storage structure for a relatively large number of cassettes, and also are capable of fully enclosing, and thereby protecting, the cassette stored in each container, the container structures provided to achieve the foregoing objectives are relatively complex and difficult to produce by molding or any other similar economic operation.

OBJECTS AND SUMMARY OF THE INVENTION

Accordingly, it is an object of the present invention to provide a storage holder for tape cassettes which avoids the previously mentioned disadvantages of the prior art.

More specifically, it is an object of this invention to provide a holder for tape cassettes which can function as a shipping, display and sales container for the cassettes, and can be later used by the consumer for storing the cassettes in an expandable storage system.

Another object of the invention is to provide a holder for cassettes, as aforesaid, which can be used as part of a storage system which is expandable at the same rate that cassettes are purchased.

Still another object of the invention is to provide a holder for tape cassettes, as aforesaid, which is relatively inexpensive and reduces the amount of packaging material that needs to be discarded.

A further object of the invention is to provide a storage holder, as aforesaid, which is relatively inexpensively produced and which is adapted to fully enclose the stored cassettes.

In accordance with an aspect of this invention, a storage holder for tape cassettes adapted also for use as a shipping and display container, is made up of a box-like housing which has opposite side, top and bottom walls and a back panel, and which is open at the front for receiving therethrough a plurality of the tape cassettes, connectors removably extending across at least the side walls of the housing and each having front and back end portions engageable with the housing for securing the respective connector thereto, a door panel separate from the box-like housing and dimensioned to extend across the front of the housing, coupling means at the front end portions of the connectors extending across the side walls of the housing, means on the door panel adjacent one of the side edges thereof and which are relatively tightly engageable with the coupling means on the connectors extending across the adjacent one of the side walls for defining a hinge for the door panel, and means on the door panel adjacent the other of the side edges and which are relatively loosely engageable with the coupling means on the connectors extending across the other of the side walls for defining a detent latch to hold the door panel in a closed position.

The coupling means at the front end portions of the connectors are desirably constituted by dimples therein, and the means on the door panel engageable with the coupling means are preferably in the form of ball-shaped projections which are relatively tightly engageable in the respective dimples in the connectors for defining the hinge of the door panel, and which are relatively loosely engageable with the respective dimples in the connectors for defining the detent latch.

The above, and other objects, feature and advantages of the invention, will be apparent in the following detailed description of an illustrative embodiment of the

DETAILED DESCRIPTION OF A PREFERRED EMBODIMENT

Figure 1:
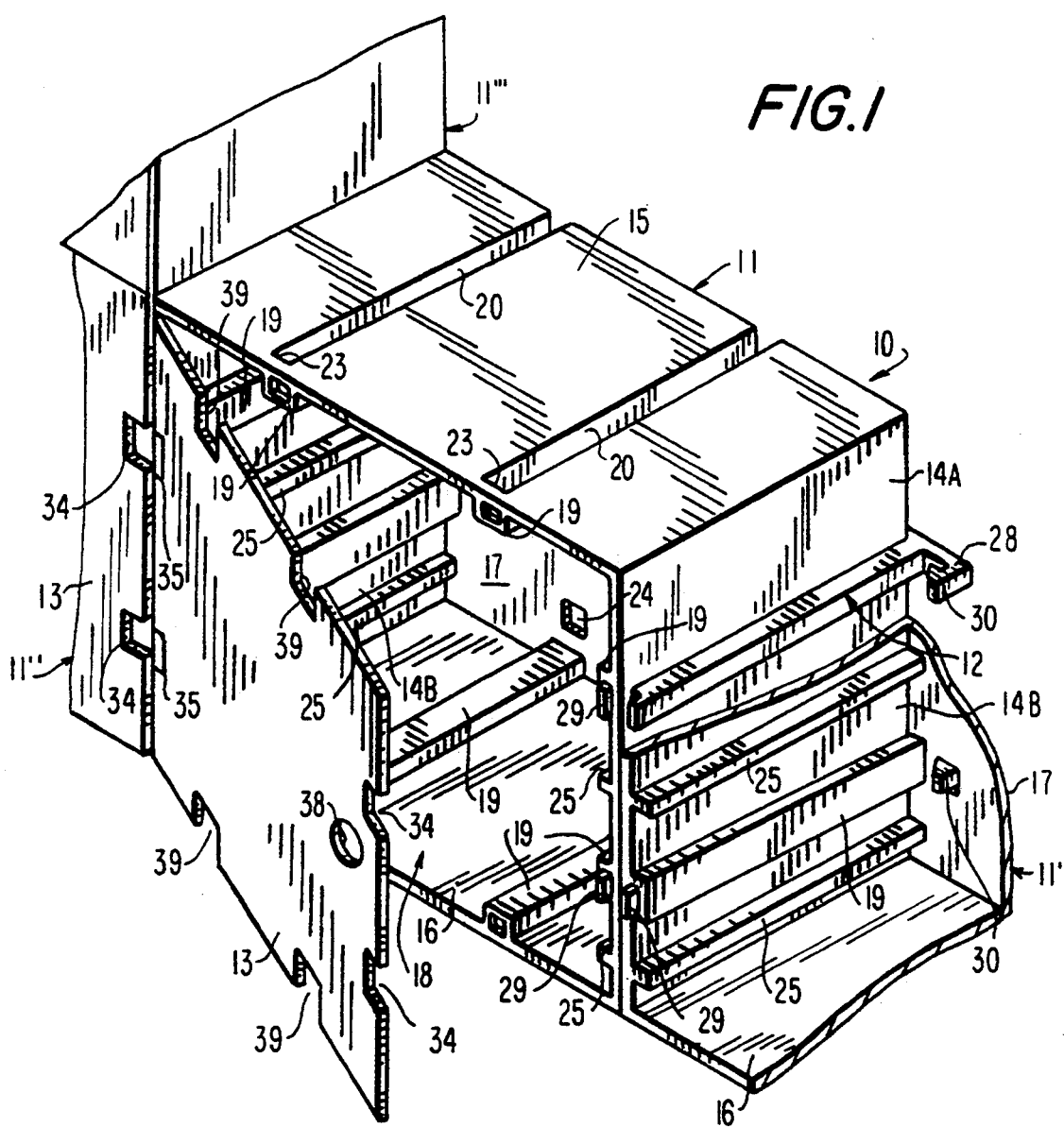
FIG. 1 is a perspective view of a display and storage holder for tape cassettes in accordance with an embodiment of this invention, and which is shown assembled together with other similar display and storage holders.

Referring to the drawings in detail, an initially to FIG. 1 thereof, it will be seen that a display and storage unit 10 for tape cassettes in accordance with an embodiment of this invention generally comprises a box-like housing 11, a plurality of connectors 12 and a door panel 13 which are all desirably injection molded of a suitable plastic such as, ABS, that is, copolymers of acrylonitrile, butadiene and styrene, GPPS, that is, general purpose polystyrene, or HIPS, that is, high impact polystyrene.

Figure 2:
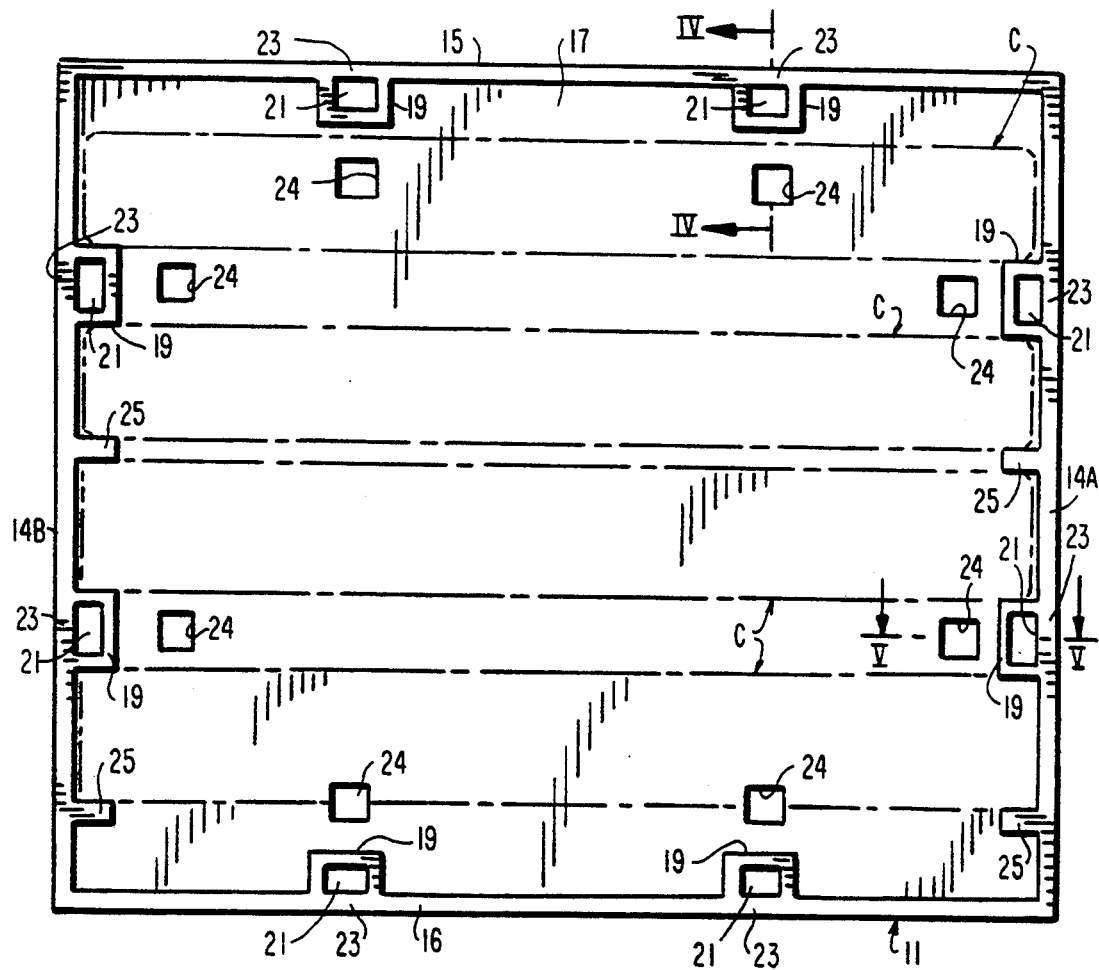
FIG. 2 is an enlarged front elevational view of a box-like housing included in the display and storage holder of FIG. 1.

The box-like housing 11 is shown to have opposite side walls 14A and 14B, a top wall 15, a bottom wall 16 and a back panel 17, so as to be open at the front, as at 18, for receiving therethrough a plurality of tape cassettes C which are indicated in dot dash lines in FIG. 2. The housing 11 of the illustrated embodiment is shown to be dimensioned for accommodating four video tape cassettes C which may be so-called Beta or VHS cassettes, but it is apparent that the housing 11 may be dimensioned to receive a larger or smaller number of such cassettes or of other types of cassettes.

Figure 4:
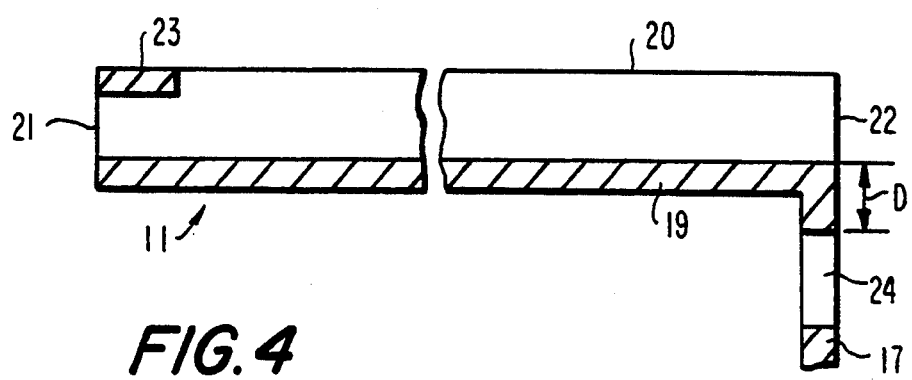
FIG. 4 is an enlarged fragmentary sectional view taken along the line IV—IV on FIG. 2.

Each of the side walls 14A and 14B and each of the top and bottom walls 15 and 16 is formed with two parallel, spaced-apart channels 19 extending thereacross, with each of the channels 19 opening along substantially its length in the direction away from the housing, as indicated at 20 on FIGS. 1 and 4. Further, each of the channels 19 opens, at its opposite ends, at the front of the housing and at the back panel 17 thereof, as indicated at 21 and 22, respectively, on FIG. 4. A bridging element 23 (FIGS. 1, 2, 4 and 5) spans each channel 19 adjacent the front opening 21 thereof and is flush with the remainder of the respective wall 14A, 14B, 15 or 16, as is apparent on FIG. 2.

The back panel 17 is further shown on FIGS. 2 and 4 to have a hole 24 therein for each of the channels 19. Each of the holes 24 is spaced inwardly the same distance D (FIGS. 4 and 5) from the opening 22 of the respective channel 19 at the back panel 17 in a direction normal to the wall 14A, 14B, 15 or 16 across which the respective channel 19 extends.

As shown particularly on FIG. 2, the channels 19 in the side walls 14A and 14B form inwardly directed ledges within the housing 11 which are spaced apart between and extend parallel to the top and bottom walls 15 and 16 for slidably receiving two of the tape cassettes C on such ledges. The side walls 14A and 14B are further formed with inwardly directed flanges 25 located approximately midway between the channels 19 in the side walls, and also with similar flanges 25 spaced downwardly from the lower-most channels 19 in the side walls. The flanges 25 constitute additional inwardly directed ledges extending parallel to the top and bottom walls 15 and 16 for slidably receiving the remaining two tape cassettes C.

Figures 3, 10:
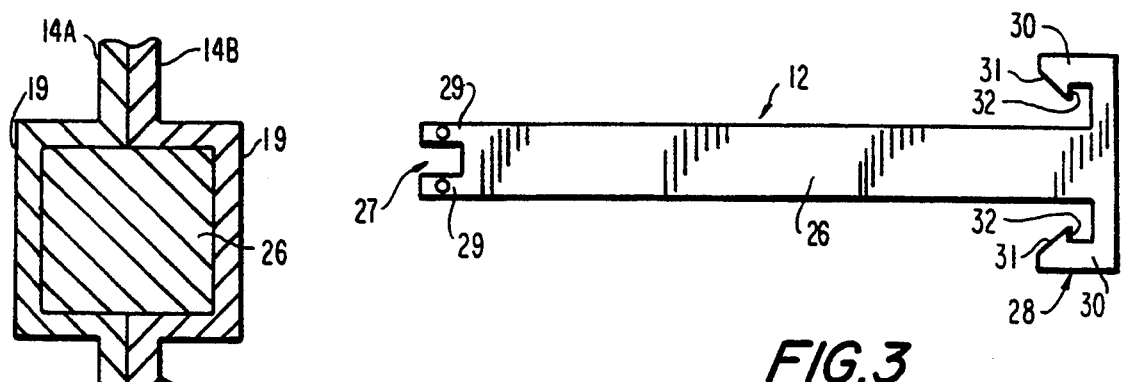
FIG. 3 is a similarly enlarged plan view of one of a number of connectors included in the display and storage holder of FIG. 1.
FIG. 10 is a sectional view taken along the line X—X on FIG. 5.

At least four of the connectors 12 are provided as parts of the display and storage unit 10 for removably extending across at least the side walls 14A and 14B of the housing 11 in the two channels 19 formed in each of such side walls. As shown in FIG. 3, each of the connectors 12 is molded to include an elongated stem 26, a bifurcated front end portion 27 and a back-end portion in the form of a head 28 so as to be substantially T-shaped.

As shown particularly on FIG. 10, the stem 26 has a cross-sectional configuration equivalent to that of two of the channels 19 when arranged to open into each other along their lengths. Therefore, for example, when the side wall 14A of the housing 11 is disposed in facially abutting relation to the side wall 14B of another similar housing 11' so that channels 19 in such abutting side walls register with each other, the stem 26 of the connector 12 is closely received in the registering channels 19.

Figure 5:
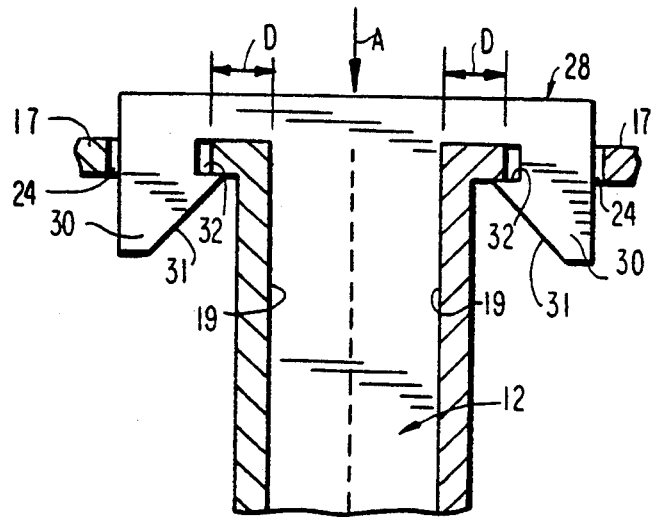
FIG. 5 is an enlarged fragmentary sectional view taken along the line V—V on FIG. 2, but showing two box-like housings of the type shown on FIG. 2 joined together by a connector of the type shown on FIG. 3.

As shown on FIGS. 3 and 5, the bifurcated front end portion 27 of each connector 12 defines two laterally spaced apart end elements 29 each insertable forwardly under the bridging element 23 spanning a channel 19 in which the stem 26 is disposed. It will be appreciated that, when the end elements 29 of a connector 12 received in channels 19 of walls 14A and 14B arranged in facially abutting relationship engage under the bridging elements 23 spanning such channels 19, the connector 12 serves to secure together the respective housings 11 and 11' at the front of the housings.

The head 28 extends across the back end of the stem 12 substantially at right angles to the latter, and latching members 30 are directed forwardly from the opposite ends of the head 28. Each of the latching members 30 has an angled surface 31 defining a nose with an undercut surface 32 at the side of the respective latching member 30 facing toward the stem 26. As shown particularly on FIG. 5, the latching members 30 are positioned relative to the stem 26 so that, when the stem 26 of a connector 12 is inserted longitudinally into a channel 19 in the direction of the arrow A, that is, in the forward direction, a latching member 30 of the connector 12 eventually extends forwardly through the hole 24 associated with the channel 19 receiving the stem 26. In the course of such insertion of the latch member 30 forwardly through the hole 24, the inclined or angled surface 31 bears against an edge of the hole 24 and causes outward flexing of the latch member 30 until its undercut surface 32 is positioned to engage the front surface of the back panel 17 for locking the connector 12 in the respective channel 19.

It will be appreciated that, when the connector 12 is inserted forwardly into the registering channels 19 in facially abutting side walls 14A and 14B of housings 11 and 11', as in FIG. 5, the latching members 30 at the opposite ends of the head 28 simultaneously engage in holes 24 in the back panels 17 of such housings and thereby secure together the housings 11 and 11' at their respective back panels. Moreover, the engagement of the undercut surfaces 32 of the latch members 30 against the front surfaces of the back panels 17 of housings 11 and 11' lock the connector 12 in assembled relation to the housings. In such assembled relation, the engagement of the front end elements 29 with the bridging elements 23 and the engagement of the latching members 30 with the holes 24 in the back panels 17 ensure that each connector 12 disposed between facially abutting walls of the housings 11 and 11' securely connects together such housings at the front and back thereof, while the engagement of the stem 26 of each such connector 12 in the registering channels 19 serves to prevent angular displacement or shifting of the connected housings relative to each other.

As is apparent on FIG. 1, the door panel 13 has its side edges and its top and bottom edges dimensioned to substantially correspond to the lengths of the side walls 14A and 14B and the top and bottom walls 15 and 16, respectively, of the housing 11 so that the door panel 13 may extend across the open front 18 of the housing 11 for closing the latter. In accordance with the present invention, means are provided on the front end portions 27 of the connectors 12 engaged in the channels 19 of the side walls 14A and 14B and are engageable with means on the door panel 13 adjacent the opposite side edges of the latter for defining a hinge structure adjacent one side edge of the door panel about which the latter is swingable between opened and closed positions, and for defining a detent latch adjacent the opposite side edge of the door panel 13 for releasably holding the latter in its closed position.

Figure 8:
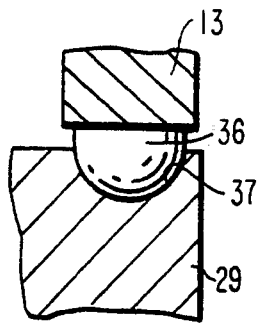
FIGS. 8 and 9 are further enlarged fragmentary sectional views taken along the lines VIII—VIII and IX—IX on FIGS. 6 and 7, respectively.
Figure 9:
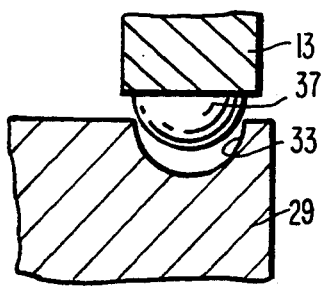
Figure 6:
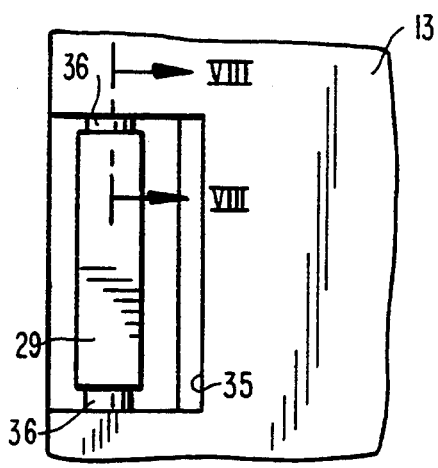
FIGS. 6 and 7 are fragmentary enlarged elevational views showing details of hinge and detent structures, respectively, included in the display and storage holder of FIG. 1.
Figure 7:
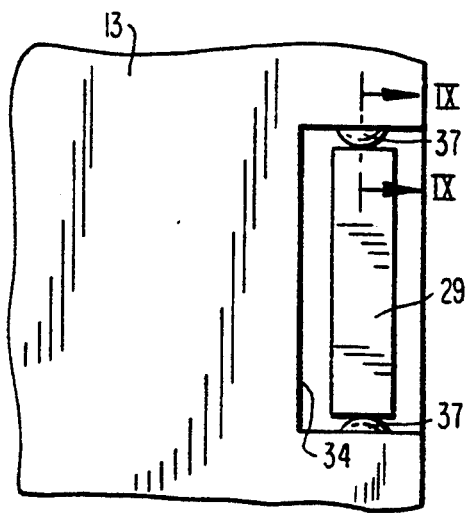

More specifically, as shown on FIG. 5, the front end elements 29 of each connector 12 are formed with dimples or hemispherical recesses 33 in the surfaces of the elements 29 which project forwardly out of the channels 19 and which face upwardly and downwardly on the connectors 12 when the latter are engaged in the channels 19 of the side walls 14A and 14B. Further, as shown on FIGS. 1, 6 and 7, the side edge portion of the door panel 13 which is adjacent the side wall 14A of the housing 11 in the closed position of the door panel is formed with two spaced apart, rectangular cutouts 34 positioned to receive front end elements 29 of the connectors 12 engaged in the channels 19 of the side wall 14A. Similarly, the side edge portion of the door panel 13 which is adjacent the side wall 14B of the housing 11 when the door panel 13 is mounted on the housing is formed with two spaced apart rectangular cutouts 35 positioned to receive the front end elements 29 of the connectors 12 engaged in channels 19 of the side wall 14B. As shown in FIGS. 6 and 8, ball-shaped projections 36 extend from the top and bottom edges of each of the cutouts 35 and are dimensioned to seat relatively deeply in the dimples 33 of the front end elements 29 received in the cutouts 35 for providing a relatively permanent hinged connection between the door panel 13 and the housing 11. As shown on FIGS. 7 and 9, ball-shaped projections 37 similarly extend from the top and bottom edges of the cutouts 34, but the ball-shaped projections 37 are dimensioned to extend only slightly into the dimples 33 in the front end elements 29 received in the cutouts 34. By reason of the foregoing, the ball-shaped projections 37 and the respective dimples 33 define a detent latch for releasably holding the door panel 13 in its closed position.

The door panel 13 is further shown to have a hole 38 formed therein adjacent the side edge portion having the cutouts 34 so that the user may insert a finger in the hole 38 for pulling open the door panel 13. The top and bottom edge portions of the door panel 13 are also shown to have rectangular cutouts 39 therein which are positioned for alignment with the channels 19 in the top and bottom walls 15 and 16, respectively, of the associated housing 11. Such cutouts 39 provide clearance for the front end elements 29 of any connectors 12 that may be engaged in the channels 19 of the top and bottom walls 15 and 16 when assembling together vertically superposed housings, as hereinafter further described.

In using the display and storage holder or unit 10 embodying this invention as packaging for a so-called multi-pack of video cassettes, the several described parts thereof are unassembled and the cassettes C to be sold are placed on the ledges formed by the channels 19 and flanges 25 in the housing 11. Then, the connectors 12 are placed in the housing 11 in the spaces between the cassettes corresponding to the locations of the channels 19 in the side walls 14A and 14B, whereupon suitable art work may be placed between the cassettes C and the door panel 13 which is merely positioned against the open front of the housing 11. Finally, the entire package is covered with a clear outer wrap. Thus, the holder 10, in its initial unassembled condition, forms a shipping, storage and display container for the cassette multi-pack, that is, for the four cassettes to be sold as a unit.

After purchase of the multi-pack, the consumer simply removes the outer wrapping so as to permit the cassettes C and the connectors 12 to be withdrawn from within the housing 11. Then the connectors 12 are installed in the channels 19 of at least the side walls 14A and 14B, and the door panel 13 is pivotally mounted on the housing 11 by the forced engagement of the ball-shaped projections 36 in the dimples 33 of the front end elements 29 received in the cutouts 35, and which thereafter define a relatively permanent hinge connection between the door panel 13 and the housing 11. Thereafter, the cassettes C can be reinstalled within the housing 11 and the door panel moved to its closed position where it is retained by the engagement of the ball-shaped projections 37 in the dimples 33 of the front end elements 29 received in the cutouts 34.

It will be apparent that the basic unit or storage holder 10 consisting of a housing 11, four connectors 12 and a door panel 13 constitutes a storage device for the four cassettes originally packaged therein. Of the original packaging material, only the clear outer wrapping and the art work possibly interposed between the packaged cassettes and the door panel have to be discarded.

As additional multi-packs are purchased, the housings which form the shipping and display containers for such multipacks may be assembled together with the housing 11 of the original or basic unit, either side-by-side therewith, as at 11' and 11'' on FIG. 1, or in vertically superposed relation to each other, as in the case of the housings 11" and 11" on FIG. 1, so as to build a storage system. When assembling together the housings in side-by-side relation, the connectors 12 inserted into the channels 19 of the side walls 14A and 14B of the housings 11 and 11', for example, and which are in facially abutting relation, serve both to secure together the respective housings and, at their front end elements 29, form part of the structural arrangement defining a hinge for the door panel to be associated with the housing 11', and also form part of the structure defining the detent latch for releasably holding closed the door panel 13 associated with the other housing 11. On the other hand, when an added storage unit is to be mounted on top of an existing storage unit, the supplied connectors 12 are installed from the back into the channels 19 of the top wall 15 of the existing housing and the channels 19 of the bottom wall 16 of the added housing.

It will be apparent that, as the consumer purchases additional cassettes, there are supplied therewith the components required for adding to the storage capacity of the storage system precisely the amount of space needed for the number of cassettes that have been newly purchased.

The housings 11 and door panels 13 may be provided in clear plastic and plastics tinted with different colors for identifying various types of cassettes and/or various types of recorded material in the customer's library or storage system.

The several components of each display and storage holder or unit 10 are designed so that they are not dimensionally critical and, therefore, can be molded of readily available reground plastic so as to minimize the cost thereof. Furthermore, the several components are designed to minimize the injection mold tooling costs therefor by avoiding the necessity to employ cam or slide mechanisms for forming details of the components.

The described storage unit 10 is most advantageous when sold as the packaging for a multi-pack of cassettes, but it will be apparent that the storage unit 10 can also be offered for sale apart from the cassettes to be stored therein.

Although a preferred embodiment of this invention has been described in detail herein with reference to the accompanying drawings, it is to be understood that the invention is not limited to that precise embodiment and that various changes and modifications may be effected therein by one skilled in the art without departing from the scope or spirit of the invention as defined in the appended claims.

What is claimed is:

1. A display and storage holder for tape cassettes comprising:
    a box-like housing having opposite side, top and bottom walls and a back panel, and being open at a front thereof for receiving therethrough a plurality of tape cassettes;
    a plurality of connectors removably extending across at least said side walls from said back panel to said front, each connector having front and back end portions engageable with said housing for securing one of said connectors thereto,
    a door panel separate from said box-like housing and having side edges and top and bottom edges dimensioned to extend across said front of the housing;
    coupling means on said front end portions of the connectors;
    means on said door panel adjacent a first of said side edges and which are engageable with said coupling means on said connectors for defining a hinge for said door panel; and
    means on said door panel adjacent a second of said side edges and which are engageable with said coupling means on said connectors for defining a detent latch to hold said door panel in a closed position.

2. A display and storage holder for tape cassettes as in claim 1; in which said side walls each have a plurality of inwardly directed ledges spaced apart between and extending parallel to said top and bottom walls for slidably receiving the tape cassettes on said ledges.

3. A display and storage holder for tape cassettes as in claim 2; in which each of said walls has channels therein each opening along substantially its length away from said housing and each further opening, at its opposite ends, at said front and said back panel, respectively; said channels in said side walls define respective ones of said ledges thereon; and said connectors are removably received in said channels.

4. A display and storage holder for tape cassettes as in claim 1; in which said front end portions of the connectors have opposed surfaces with dimples therein constituting said coupling means, and said means on the door panel engageable with said coupling means are ball-shaped projections, respectively dimensioned to seat relatively deeply into said dimples for forming said hinge and dimensioned to extend only slightly into said dimples for defining said detent latch.

5. A display and storage holder for tape cassettes as in claim 1; in which each of said walls has a channel extending thereacross for each of said connectors, each of said channels opens, at its opposite ends, at said front and at said back panel, respectively, and has a bridging element spanning the respective channel adjacent said front of the housing with each said channel being otherwise open along its length in the direction away from the housing, said back panel has a hole therein for each of said channels which is spaced inwardly a predetermined distance from the opening of the respective channel at said back panel in a direction normal to the one of said walls across which said respective channel extends; and each of said connectors extends along the respective channel and is engaged by said bridging element at said front end portion while said back end portion extends into said hole for the respective channel and engages said back panel for locking each said connector in said respective channel.

6. A display and storage holder for tape cassettes as in claim 5; in which each of said connectors includes an elongated stem engageable in said respective channel, said front end portion is of reduced width relative to said stem so as to extend forwardly under said bridging element, and said back end portion extends at right angles to said stem in back of said back panel and terminates in a latching member which extends forwardly through said hole and has an undercut nose engaging said back panel at the front surface of the latter for said locking of said connector in said respective channel.

7. A display and storage holder for tape cassettes as in claim 6; in which each of said connectors is T-shaped and said stem thereof has a cross-sectional configuration equivalent to that of two of said channels when arranged to open into each other along their lengths, said front end portion is bifurcated, and said back end portion is in the form of a head having said latching member at each of its opposite ends.

8. A display and storage holder for tape cassettes comprising:
- at least two box-like housings each having opposite side, top and bottom walls and back panel, and being open at a front thereof for receiving therethrough a respective plurality of tape cassettes, said box-like housings being arranged with one of said walls of one of said housings in facially abutting relation with another of said walls of another of said housings;
- a plurality of connectors removably extending across at least said side walls of each of said box-like housings from said back panel to said front, with each connector being interposed between said walls of said housings which are in facially abutting relation, each of said connectors having front and back end portions engageable with said housings having said walls across which the respective connectors extend and between which said connectors are interposed for securing together said housings;
- a door panel for each said box-like housing separate from the latter and having side edges and top and bottom edges dimensioned to extend across said front of the respective housing;
- coupling means on said front end portions of the connectors;
- means on each said door panel adjacent a first of said side edges and which are engageable with said coupling means on said connectors for defining a hinge for the respective door panel; and
- means on each said door panel adjacent a second of said side edges and which are engageable with said coupling means on said connectors for defining a detent latch to hold said respective door panel in a closed position.

9. A display and storage holder for tape cassettes as in claim 8; in which said side walls of each of said housings each have a plurality of inwardly directed ledges spaced apart between and extending parallel to said top and bottom walls of the respective housing for slidably receiving the respective tape cassettes on said ledges.

10. A display and storage holder for tape cassettes as in claim 9; in which each of said walls of the housings has channels therein each opening along substantially its length away from the respective housing and each further opening, at its opposite ends, at said front and said back panel, respectively, of the housing; said channels in said side walls define respective ones of said ledges thereon; and said connectors are removably received in said channels.

11. A display and storage holder for tape cassettes as in claim 8; in which said front end portions of the connectors have opposed surfaces with dimples therein constituting said coupling means, and said means on each said door panel engageable with said coupling means are ball-shaped projections dimensioned to seat relatively deeply into said dimples for form said hinge for the respective door panel and dimensioned to extend only slightly into said dimples for defining said detent latch for said respective door panel.

12. A display and storage holder for tape cassettes as in claim 8; in which each of said walls has a channel extending thereacross for each of said connectors, each of said channels opens, at its opposite ends, at said front and at said back panel, respectively, of the respective housing and has a bridging element spanning the respective channel adjacent said front of said respective housing with each said channel being otherwise open along its length in the direction away from said respective housing, said back panel of each of said housings has a hole therein for each of said channels which is spaced inwardly a predetermined distance from the opening of the respective channel at said back panel in a direction normal to the one of said walls of the respective housing across which said respective channel extends; and each of said connectors extends along the respective channel and is held in the latter by said bridging element at said front end portion while said back end portion extends into said hole for the respective channel and engages said back panel for locking each said connector in said respective channel.

13. A display and storage holder for tape cassettes as in claim 12; in which each of said connectors is T-shaped and includes an elongated stem which is bifurcated at said front end portion and a head crossing said stem and forming said back end portion of the respective connector, said stem has a cross-sectional configuration equivalent to two of said channels so that, when said connector is interposed between said facially abutting walls, said stem is received in two of said channels opening toward each other in said facially abutting walls, said bifurcated front end portion of the stem defining two spaced apart end elements insertable forwardly under said bridging elements respectively spanning said channels receiving said stem, and said head terminates at each end thereof in a latching member which extends forwardly through said hole for the channel receiving the respective stem and which has an undercut nose engaging said back panel at the front surface of the latter for said locking of said connector in said respective channel.

* * * * *